(12) United States Patent
Stenfort et al.

(10) Patent No.: US 7,360,119 B1
(45) Date of Patent: Apr. 15, 2008

(54) METHOD AND APPARATUS FOR HANDLING SAS/SATA COMMUNICATION DEADLOCK

(75) Inventors: Ross Stenfort, San Jose, CA (US); Stillman Gates, Los Gatos, CA (US)

(73) Assignee: Adaptec, Inc., Milpitas, CA (US)

( * ) Notice: Subject to any disclaimer, the term of this patent is extended or adjusted under 35 U.S.C. 154(b) by 473 days.

(21) Appl. No.: 10/795,183

(22) Filed: Mar. 3, 2004

(51) Int. Cl.
*G06F 11/00* (2006.01)

(52) U.S. Cl. .............................. 714/43
(58) Field of Classification Search ............ 714/43, 714/56

See application file for complete search history.

(56) References Cited

U.S. PATENT DOCUMENTS

| | | | |
|---|---|---|---|
| 4,494,193 A * | 1/1985 | Brahm et al. | 709/225 |
| 4,864,617 A * | 9/1989 | Holmquist | 380/267 |
| 4,868,741 A * | 9/1989 | Gula et al. | 710/113 |
| 5,016,167 A * | 5/1991 | Nguyen et al. | 711/151 |
| 5,133,074 A * | 7/1992 | Chou | 711/146 |
| 5,305,442 A * | 4/1994 | Pedersen et al. | 710/110 |
| 5,355,455 A * | 10/1994 | Hilgendorf et al. | 710/306 |
| 5,469,435 A * | 11/1995 | Krein et al. | 370/462 |
| 5,542,056 A * | 7/1996 | Jaffa et al. | 710/311 |
| 5,544,332 A * | 8/1996 | Chen | 710/108 |
| 5,889,972 A * | 3/1999 | Allingham | 710/311 |
| 5,949,981 A * | 9/1999 | Childers | 710/310 |
| 6,073,182 A * | 6/2000 | Jones et al. | 709/253 |
| 6,292,488 B1 * | 9/2001 | Filgate | 370/401 |
| 6,665,818 B1 * | 12/2003 | Dickey et al. | 714/32 |

* cited by examiner

*Primary Examiner*—Robert Beausoliel
*Assistant Examiner*—Amine Riad
(74) *Attorney, Agent, or Firm*—Martine Penilla & Gencarella, LLP

(57) ABSTRACT

Broadly speaking, a method and apparatus is provided for identifying and responding to a deadlock condition in a SAS/SATA communication process. More specifically, an initiator device involved in the SAS/SATA communication process is defined to recognize a received error signal as an indication of a potential communication deadlock condition. The initiator device is further defined to promptly respond to the received error signal with a course of action for recovering from the communication deadlock condition.

20 Claims, 3 Drawing Sheets

METHOD AND APPARATUS FOR HANDLING SAS/SATA COMMUNICATION DEADLOCK

BACKGROUND OF THE INVENTION

1. Field of the Invention

The present invention relates generally to electronic device communication.

2. Description of the Related Art

Modern computing systems generally include a number of devices in communication with each other. For example, one device may be a host computer and another device may be a hard drive connected as a peripheral device. Communication (i.e., data transfer) protocols are used to enable communication between the devices. In addition, standard communication protocols have been developed to ensure communication compatibility between various devices. The standard communication protocols provide rigid frameworks and processes for conducting data transfers between devices. Thus, the standard communication protocols are interlocked protocols that follow a distinct series of events. For example, Serial Attached SCSI (SAS) represents a set of standard protocols used for communication to and from a storage device. Also, Serial AT Attachment (SATA) represents another protocol used for communication to and from a storage device.

Communication using a standard protocol, e.g., SAS or SATA, may involve transmitting a sequence of commands that are dependent upon one another, i.e., the sequence of commands rely upon one another for proper interpretation by a receiving device. If the sequence of dependent commands is interrupted during transmission, the receiving device may not be able to properly understand and respond to the commands. For example, if the link between two devices is temporarily lost during a transmission, the receiving device may only receive an uninterpretable portion of the sequence of dependent commands. In this situation, the two communicating devices are unable to further respond to each other, thus creating a deadlocked situation.

One prior art method for recovering from such a deadlocked situation in either a SAS or SATA communication process relies on an operating system of a device involved in the communication process to issue a command time-out. Once the command time-out is issued, the devices involved in the communication process are reset. However, issuance of the command time-out by the operating system may only occur after a substantial amount of time has elapsed. Thus, the prior art allows a deadlocked SAS or SATA communication process to exist for a substantial amount of time prior to correction.

In view of the foregoing, a method is needed to identify and respond to a deadlocked communication process in a timely and efficient manner.

SUMMARY OF THE INVENTION

Broadly speaking, the present invention provides a method and apparatus for identifying and responding to a communication deadlock condition. More specifically, in the present invention an initiator device is defined to recognize a received error signal as an indication of a potential communication deadlock condition. The initiator device is further defined to promptly respond to the received error signal with a course of action for recovering from the communication deadlock condition. Thus, the present invention avoids an extended duration of the communication deadlock condition associated with having to wait for a higher level operating system to issue a command time-out in order to recover from the communication deadlock condition.

In one embodiment, a method for identifying and responding to a deadlock condition in an electronic communication process is disclosed. The method includes performing an electronic communication process between an initiator device and a target device through an expander device. The method also includes receiving an error signal at the initiator device from the expander device. The method further includes operating the initiator device to recognize the error signal as an indication of a potential deadlock condition. Also in the method, the initiator device is operated to respond to the potential deadlock condition.

In another embodiment, an initiator device configured to identify and respond to a deadlock condition during an electronic communication process is disclosed. The initiator device includes circuitry configured to enable communication with a target device through an expander device. The initiator device also includes circuitry configured to receive an error signal from the expander device. The initiator device further includes circuitry configured to recognize the error signal as an indication of a potential deadlock condition. Circuitry is also provided in the initiator device to respond to the potential deadlock condition.

In another embodiment, a computer readable media containing program instructions for identifying and responding to a deadlock condition in an electronic communication process is disclosed. The computer readable media includes program instructions for performing an electronic communication process between an initiator device and a target device through an expander device. Program instructions are also provided for receiving an error signal at the initiator device from the expander device. Program instructions are also provided for operating the initiator device to recognize the error signal as an indication of a potential deadlock condition. The computer readable media further includes program instructions for operating the initiator device to respond to the potential deadlock condition.

Other aspects of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which.

DETAILED DESCRIPTION

Broadly speaking, the present invention provides a method and apparatus for identifying and responding to a communication deadlock condition. More specifically, in the present invention an initiator device involved in either a Serial Attached SCSI (SAS) or Serial AT Attachment (SATA) communication process is defined to recognize a received error signal as an indication of a potential communication deadlock condition. The initiator device is further defined to promptly respond to the received error signal with a course of action for recovering from the communication deadlock condition. Thus, the present invention avoids an extended duration of the SAS/SATA communication deadlock condition associated with having to wait for a higher level operating system to issue a command time-out in order to recover from the deadlock condition.

It should be appreciated that the present invention can be implemented in numerous ways, including as a process, an apparatus, a system, a device, or a method. Several exemplary embodiments of the invention will now be described in detail with reference to the accompanying drawings.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
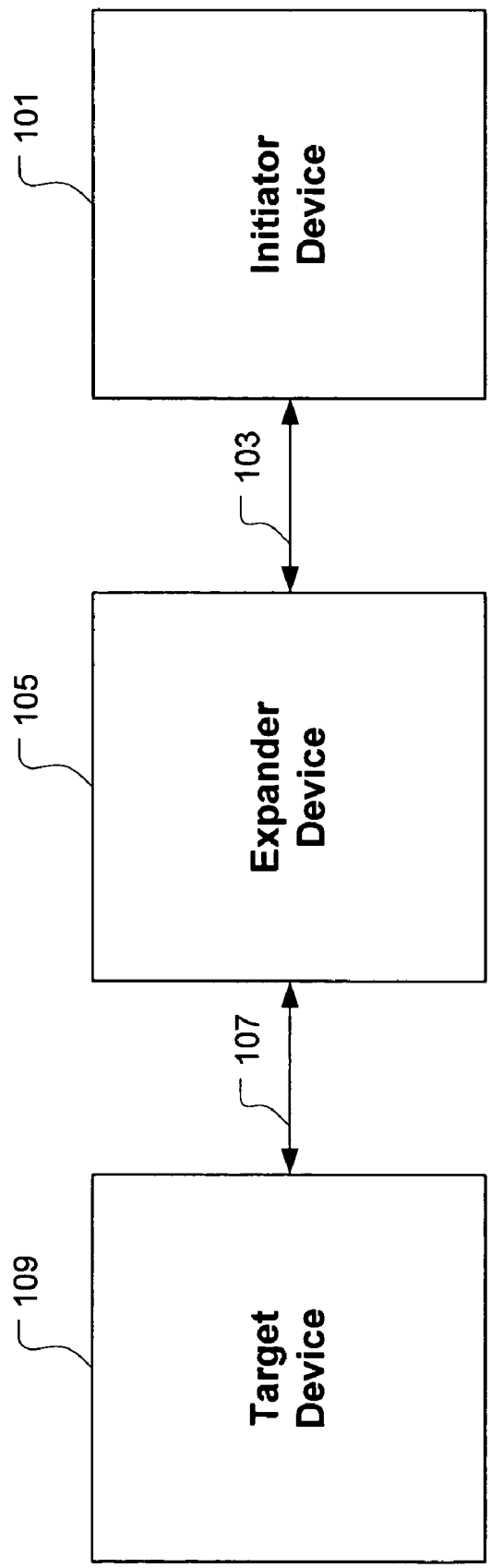
FIG. 1 is an illustration showing a block diagram of a device configuration for performing the SAS/SATA communication process, in accordance with one embodiment of the present invention.

FIG. 1 is an illustration showing a block diagram of a device configuration for performing the SAS/SATA communication process, in accordance with one embodiment of the present invention. It should be appreciated that the SAS/SATA reference as used herein refers to either the SAS protocol, the SATA protocol, or a combination of the SAS and SATA protocols. It should be further appreciated that the SAS communication protocol represents a set of protocols including a Serial SCSI Protocol (SSP), a SATA Tunneled Protocol (STP), and a Serial Management Protocol (SMP). With respect to FIG. 1, an initiator device 101 is connected through a link 103 to an expander device 105. The expander device 105 is also connected through a link 107 to a target device 109. The initiator device 101 communicates with the expander device 105 through the link 103 using the STP protocol. The target device 109 communicates with the expander device 105 through the link 107 using the SATA protocol. Therefore, the initiator device 101 and the target device 109 are configured to communicate with each other through the expander 105, wherein the expander 105 acts as a pass-through multiplexer.

During the communication process, the link 107 between the target device 109 and the expander device 105 may be inadvertently interrupted. For example, the target device 109 may lose sync with the expander device 105, thus causing the link 107 to be interrupted such that data cannot be transmitted from the target device 109 to the expander device 105, and ultimately to the initiator device 103. Furthermore, it is possible for the link 107 to be interrupted at particularly vulnerable instances in the communication process.

For example, if the target device 109 is transmitting a sequence of commands that are dependent upon one another, interruption of the link 107 may occur at an instance that prevents a critical portion of the sequence of commands from being successfully transmitted. Thus, only a portion of the sequence of commands excluding the critical portion is transmitted through to the initiator device 101. Without the critical portion of the sequence of commands, the initiator device 101 is unable to properly interpret and respond to the sequence of commands. To further compound this situation, the target device 109 is unaware that the link 107 has been interrupted such that a portion of the sequence of commands was not transmitted successfully. Thus, in this situation, the target device 109 is awaiting a response from the initiator device 101 assuming that the complete sequence of commands has been successfully received by the initiator device 101. Also, since the initiator device 101 is unable to properly interpret the sequence of commands, the initiator device 101 is unable to properly respond to the target device 109. Such a situation in which the target device 109 and the initiator device 101 are waiting on each other in order to proceed with the communication process is called a deadlock condition.

To further describe the deadlock condition in the SAS/SATA communication process, an example situation resulting in a deadlock condition will now be discussed. Consider that the target device 109 and the initiator device 101 are communicating through the expander device 105 via their respective links 107 and 103, in accordance with the SAS/SATA protocol. The target device 109 is sending a sequence of dependent commands including <SATA_X_RDY> followed by <SATA_CONT> followed by <scrambled data>. In this particular sequence of commands, the <SATA_X_RDY> primitive indicates that the target device 109 is ready to transmit a frame of data to the initiator device 101. The <SATA_CONT> primitive indicates that the <scrambled data> to follow should be interpreted as a successive repetition of the <SATA_X_RDY> primitive. Thus, the sequence of dependent commands described above is intended to represent repetitive transmission of the <SATA_X_RDY> primitive from the target device 109 to the initiator device 101. The target device 109 is expecting to receive a particular transmission back from the initiator device 101 in response to the above-described sequence of commands.

Suppose that the link 107 is interrupted such that the <SATA_X_RDY> and the <SATA_CONT> primitives are not successfully transmitted through the expander device 105 to the initiator device 101. However, the link 107 is restored in time to transmit the <scrambled data> through the expander device 105 to the initiator device 101. In this situation, the initiator device 101 is unable to properly interpret and respond to the <scrambled data>. Also, the target device 109 is unaware that the <SATA_X_RDY> and the <SATA_CONT> primitives were lost in transmission. Thus, a deadlock condition exists in which both the target device 109 and the initiator device 101 are waiting to receive a transmission from each other in order to proceed with the communication process.

Conventionally, when a deadlock condition occurs in the SAS/SATA communication process, the deadlock condition will persist until an operating system associated with the initiator device 101 recognizes that a time-out period has expired. When the time-out period expires, the operating system will instruct the initiator device 101 to take action to reset the device configuration and repeat the communication process. Unfortunately, the time-out period associated with the operating system can be quite long relative to a desired communication process duration. Therefore, it is not efficient to simply wait for expiration of an operating system time-out period in order to recover from a deadlock condition in a SAS/SATA communication process. The present invention provides a method and associated apparatus for promptly identifying and responding to a deadlock condition in the SAS/SATA communication process. Thus, the method and associated apparatus of the present invention avoids having to wait for expiration of the operating system time-out period in order to recover from the deadlock condition.

In the event that the link 107 between the target device 109 and the expander device 105 is interrupted, the SAS/SATA protocol will require the expander device 105 to send an error signal in the form of a <SATA_ERROR> primitive to the initiator device 101. However, the SAS/SATA protocol does not specify how the error signal is to be handled by the initiator device 101. Furthermore, the <SATA_ERROR> primitive sent to the initiator device 101 from the expander device 105 does not provide a specific indication as to what event has occurred. For example, consider that the communication process is being performed in accordance with the SAS/SATA protocol. In the event that the link 107 is interrupted due to a loss of sync between the target device 109 and the expander device 105, the SAS/SATA protocol requires the expander device 105 to send the <SATA_ERROR> primitive to the initiator device 101. However, the SAS/SATA protocol does not specify how the initiator device should respond to receipt of the <SATA_ERROR> primitive in regard to the link 107. Furthermore, the SAS/SATA protocol does not attribute a particular meaning to the <SATA_ERROR> primitive in regard to the link 107. Thus, according to the SAS/SATA protocol, the initiator device 101 will not respond to the <SATA_ERROR> primitive with a specific course of action for the link 107.

In the method and apparatus of the present invention, the initiator device 101 is defined to recognize a received error signal, i.e., <SATA_ERROR> primitive as being indicative that a potential deadlock condition exists. Also, the initiator device 101 is further defined to promptly respond to the received error signal with a course of action for recovering from the deadlock condition. In one embodiment, the initiator device 101 is defined to verify a presence of the deadlock condition prior to executing the course of action for recovering from the deadlock condition.

Figure 2:
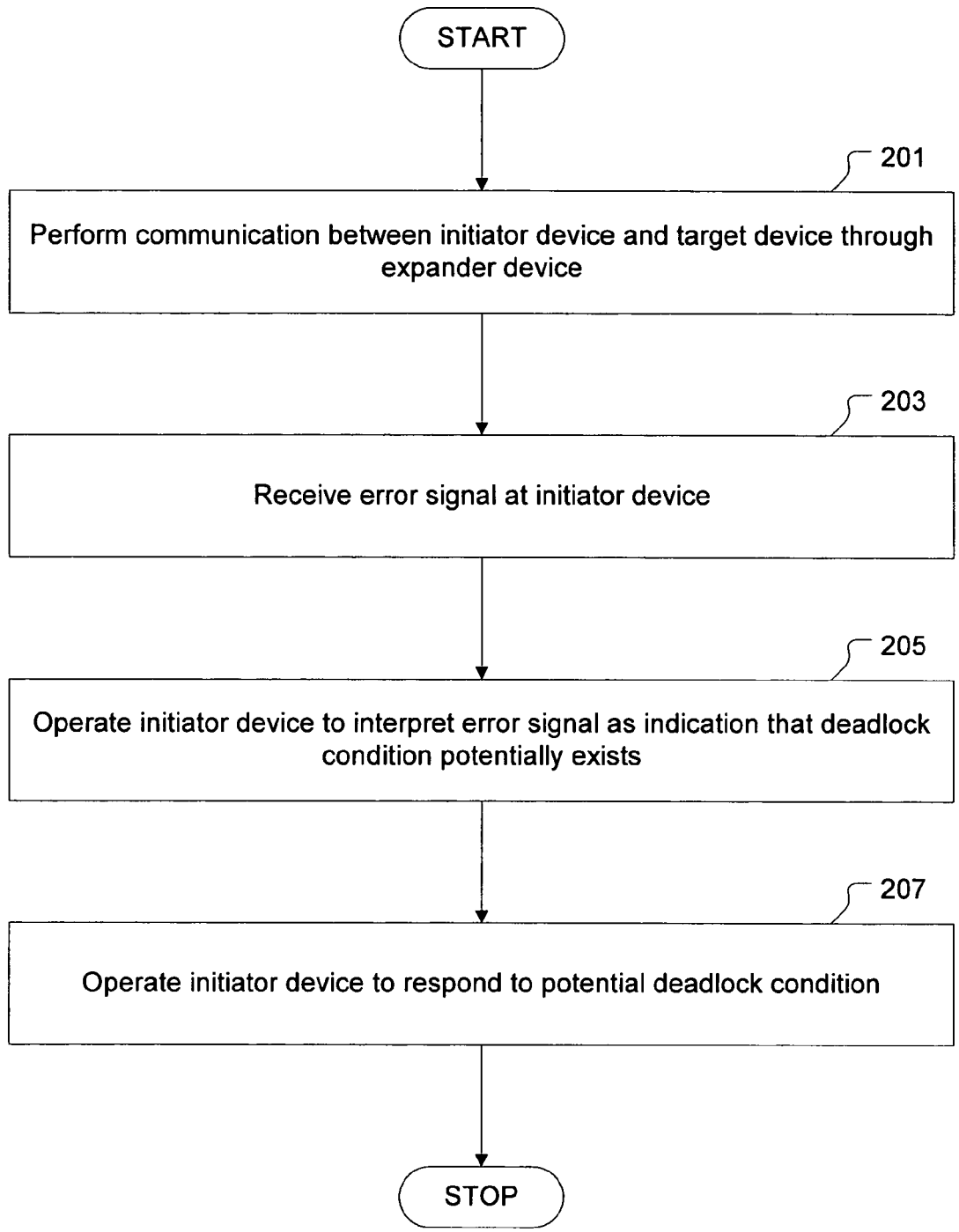
FIG. 2 is an illustration showing a flowchart of a method for identifying and responding to a deadlock condition in a SAS/SATA communication process, in accordance with one embodiment of the present invention.

FIG. 2 is an illustration showing a flowchart of a method for identifying and responding to a deadlock condition in a SAS/SATA communication process, in accordance with one embodiment of the present invention. The method includes an operation 201 in which the SAS/SATA communication process is performed between an initiator device and a target device through an expander device. The method also includes an operation 203 for receiving an error signal in the form of a <SATA_ERROR> primitive at the initiator device from the expander device.

In one embodiment, the error signal is transmitted by the expander device in response to an event associated with the target device. In another embodiment, the error signal is transmitted by the expander device in response to an event associated with the link between the expander device and target device. It should be appreciated that the error signal can also be generated in response to a number of other events associated with the device configuration through which the SAS/SATA communication process is being performed.

The method continues with an operation 205 in which the initiator device is operated to recognize the received <SATA_ERROR> primitive as an indication of a potential deadlock condition in the SAS/SATA communication process. The method further includes an operation 207 for operating the initiator device to respond to the potential deadlock condition.

Figure 3:
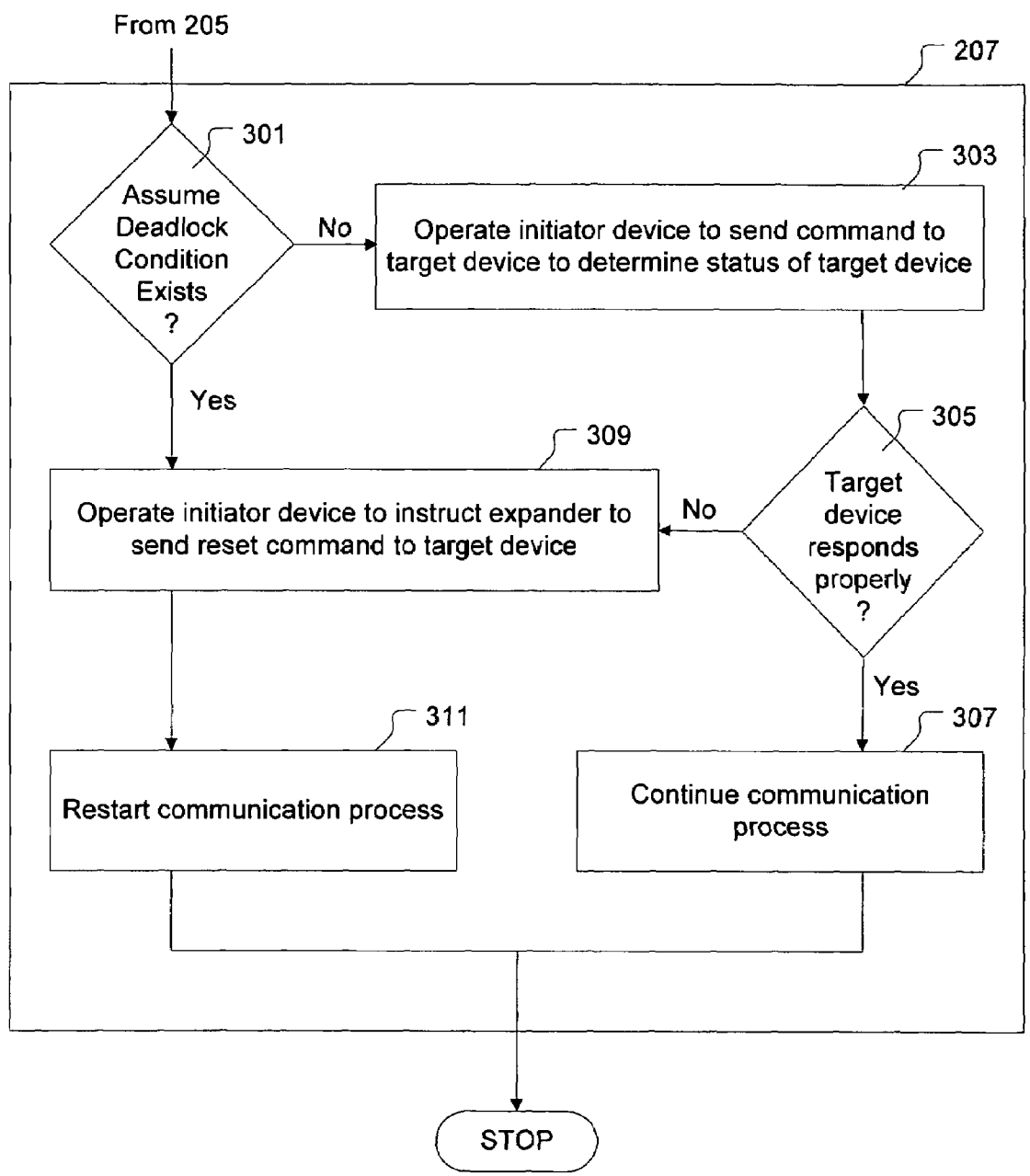
FIG. 3 is an illustration showing a flowchart of a method for operating the initiator device to respond to the potential deadlock condition, in accordance with one embodiment of the present invention.

FIG. 3 is an illustration showing a flowchart of a method for operating the initiator device to respond to the potential deadlock condition, in accordance with one embodiment of the present invention. The method of FIG. 3 represents an expansion of the operation 207 from FIG. 2. In accordance with an operation 301, the initiator device is configured to either automatically assume that the received <SATA_ERROR> primitive indicates the existence of a deadlock condition or require confirmation that the received <SATA_ERROR> primitive indicates the existence of a deadlock condition.

If the initiator device is configured to automatically assume that the received <SATA_ERROR> primitive indicates the existence of a deadlock condition, the method proceeds with an operation 309. In the operation 309, the initiator device is operated to respond to the deadlock condition by instructing the expander device to send a reset command to the target device. The target device is configured to respond to the reset command in accordance with the SAS/SATA protocol. The method then proceeds with an operation 311 for restarting the SAS/SATA communication process.

If in the operation 301, the initiator device is configured to require confirmation that the received <SATA_ERROR> primitive indicates the existence of a deadlock condition, the method proceeds from the operation 301 to an operation 303. The operation 303 includes operating the initiator device to send a command to the target device through the expander device, wherein the command is defined to cause the target device to provide a response that is indicative of a status of the target device. The method then proceeds to an operation 305 for determining whether the target device responds properly to the command.

If the target device responds properly to the command sent in operation 303, the target device is considered to be in a satisfactory state, and the deadlock condition is determined to not exist. In the absence of the deadlock condition, the method proceeds with an operation 307 in which the SAS/SATA communication process is continued from a communication state existing when the initiator device received the <SATA_ERROR> primitive.

If it is determined in the operation 305 that the target device has not responded or has not responded properly to the command sent in operation 303, the deadlock condition is determined to exist. Once the deadlock condition is determined to exist, the method proceeds with the operation 309. As previously discussed, the operation 309 includes operating the initiator device to instruct the expander device to send a reset command to the target device. Also, as previously discussed, the method proceeds from the operation 309 to the operation 311 in which the SAS/SATA communication process is restarted.

One skilled in the art will appreciate that the present invention can be defined on a semiconductor chip using logic gates configured to provide the functionality of the method as previously discussed. For example, a hardware description language (HDL) can be employed to synthesize hardware and a layout of the logic gates for providing the necessary functionality described herein.

Furthermore, with the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated.

Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A method for identifying and responding to a deadlock condition in an electronic communication process, comprising:

performing an electronic communication process between an initiator device and a target device through an expander device;

receiving an error signal at the initiator device from the expander device;

operating the initiator device to recognize the error signal as an indication of a potential deadlock condition; and operating the initiator device to respond to the potential deadlock condition by instructing the expander device to send a reset command to the target device.

2. A method for identifying and responding to a deadlock condition in an electronic communication process as recited in claim 1, wherein the electronic communication process is performed in accordance with a Serial Attached SCSI (SAS) protocol, the error signal being represented as a <SATA_ERROR> primitive.

3. A method for identifying and responding to a deadlock condition in an electronic communication process as recited in claim 1, further comprising:

restarting the electronic communication process between the initiator device and the target device through the expander device.

4. A method for identifying and responding to a deadlock condition in an electronic communication process as recited in claim 1, wherein operating the initiator device to respond to the potential deadlock condition includes operating the initiator device to send a command to the target device through the expander device, the command being defined to cause the target device to provide a response that is indicative of a status of the target device.

5. A method for identifying and responding to a deadlock condition in an electronic communication process as recited in claim 4, wherein a proper response by the target device to the command is indicative of a satisfactory status of the target device.

6. A method for identifying and responding to a deadlock condition in an electronic communication process as recited in claim 5, further comprising:

continuing the electronic communication process between the initiator device and the target device through the expander device from a communication state existing when the error signal was received by the initiator device.

7. A method for identifying and responding to a deadlock condition in an electronic communication process as recited in claim 4, wherein an improper response by the target device to the command verifies a presence of a deadlock condition.

8. A method for identifying and responding to a deadlock condition in an electronic communication process as recited in claim 7, further comprising:

operating the initiator device to instruct the expander device to send a reset command to the target device; and restarting the electronic communication process between the initiator device and the target device through the expander device.

9. An initiator device configured to identify and respond to a deadlock condition during an electronic communication process, comprising:

circuitry configured to enable communication with a target device through an expander device;

circuitry configured to receive an error signal from the expander device;

circuitry configured to recognize the error signal as an indication of a potential deadlock condition; and circuitry configured to respond to the potential deadlock condition by instructing the expander device to send a reset command to the target device.

10. An initiator device configured to identify and respond to a deadlock condition during an electronic communication process as recited in claim 9, further comprising:

circuitry configured to restart the electronic communication process between the initiator device and the target device through the expander device.

11. An initiator device configured to identify and respond to a deadlock condition during an electronic communication process as recited in claim 9, wherein the circuitry configured to respond to the potential deadlock condition includes circuitry configured to send a command to the target device through the expander device, the command being defined to cause the target device to provide a response that is indicative of a status of the target device.

12. An initiator device configured to identify and respond to a deadlock condition during an electronic communication process as recited in claim 11, further comprising:

circuitry configured to recognize a proper response by the target device to the command; and circuitry configured to continue the electronic communication process between the initiator device and the target device through the expander device from a communication state corresponding to receipt of the error signal by the initiator device.

13. An initiator device configured to identify and respond to a deadlock condition during an electronic communication process as recited in claim 11, further comprising:
  circuitry configured to recognize an improper response by the target device to the command;
  circuitry configured to instruct the expander device to send a reset command to the target device; and
  circuitry configured to restart the electronic communication process between the initiator device and the target device through the expander device.

14. A computer readable media containing program instructions for identifying and responding to a deadlock condition in an electronic communication process, comprising:
  program instructions for performing an electronic communication process between an initiator device and a target device through an expander device;
  program instructions for receiving an error signal at the initiator device from the expander device;
  program instructions for operating the initiator device to recognize the error signal as an indication of a potential deadlock condition; and
  program instructions for operating the initiator device to respond to the potential deadlock condition by instructing the expander device to send a reset command to the target device.

15. A computer readable media containing program instructions for identifying and responding to a deadlock condition in an electronic communication process as recited in claim 14, wherein the program instructions for operating the initiator device to respond to the potential deadlock condition include program instructions for restarting the electronic communication process between the initiator device and the target device through the expander device.

16. A computer readable media containing program instructions for identifying and responding to a deadlock condition in an electronic communication process as recited in claim 14, wherein the program instructions for operating the initiator device to respond to the potential deadlock condition includes program instructions for operating the initiator device to send a command to the target device through the expander device, the command being defined to cause the target device to provide a response that is indicative of a status of the target device.

17. A computer readable media containing program instructions for identifying and responding to a deadlock condition in an electronic communication process as recited in claim 16, further comprising:
  program instructions for recognizing a proper response by the target device to the command as being indicative of a satisfactory status of the target device; and
  program instructions for continuing the electronic communication process between the initiator device and the target device through the expander device from a communication state existing when the error signal was received by the initiator device.

18. A computer readable media containing program instructions for identifying and responding to a deadlock condition in an electronic communication process as recited in claim 16, further comprising:
  program instructions for recognizing an improper response by the target device to the command as being verification of a presence of a deadlock condition;
  program instructions for operating the initiator device to instruct the expander device to send a reset command to the target device; and
  program instructions for restarting the electronic communication process between the initiator device and the target device through the expander device.

19. A method for identifying and responding to a deadlock condition in an electronic communication process, comprising:
  performing an electronic communication process between an initiator device and a target device through an expander device;
  receiving an error signal at the initiator device from the expander device;
  operating the initiator device to recognize the error signal as an indication of a potential deadlock condition; and
  in response to initiator device recognition of the potential deadlock condition, operating the initiator device to send a command to the target device through the expander device, the command being defined to cause the target device to provide a response that is indicative of a status of the target device.

20. An initiator device configured to identify and respond to a deadlock condition during an electronic communication process, comprising:
  circuitry configured to enable communication with a target device through an expander device;
  circuitry configured to receive an error signal from the expander device;
  circuitry configured to recognize the error signal as an indication of a potential deadlock condition; and
  circuitry configured to respond to the potential deadlock condition by sending a command to the target device through the expander device, the command being defined to cause the target device to provide a response that is indicative of a status of the target device.

* * * * *